July 23, 1946.   W. R. BRANT ET AL   2,404,349
VALVE
Filed Nov. 29, 1944   2 Sheets-Sheet 2
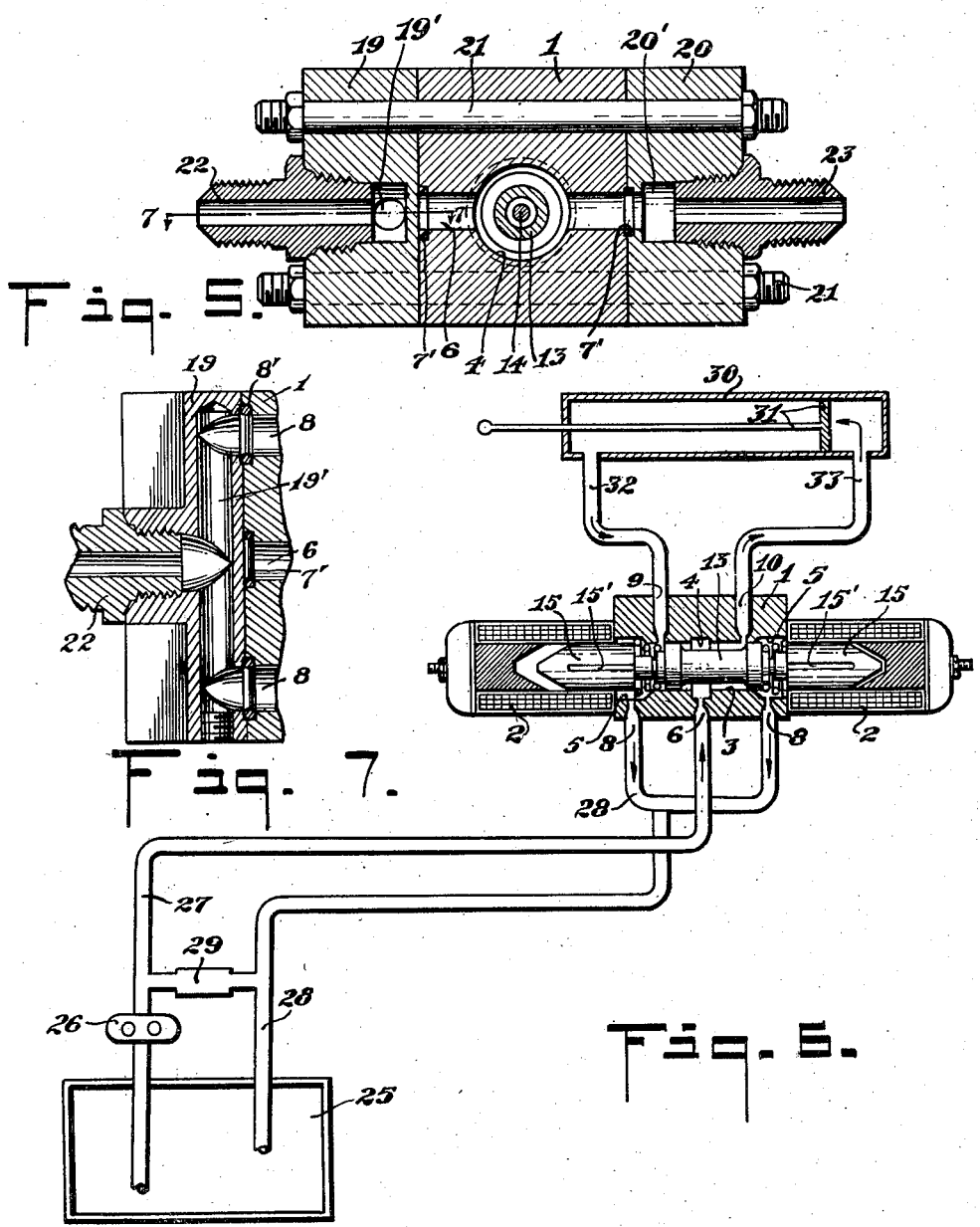

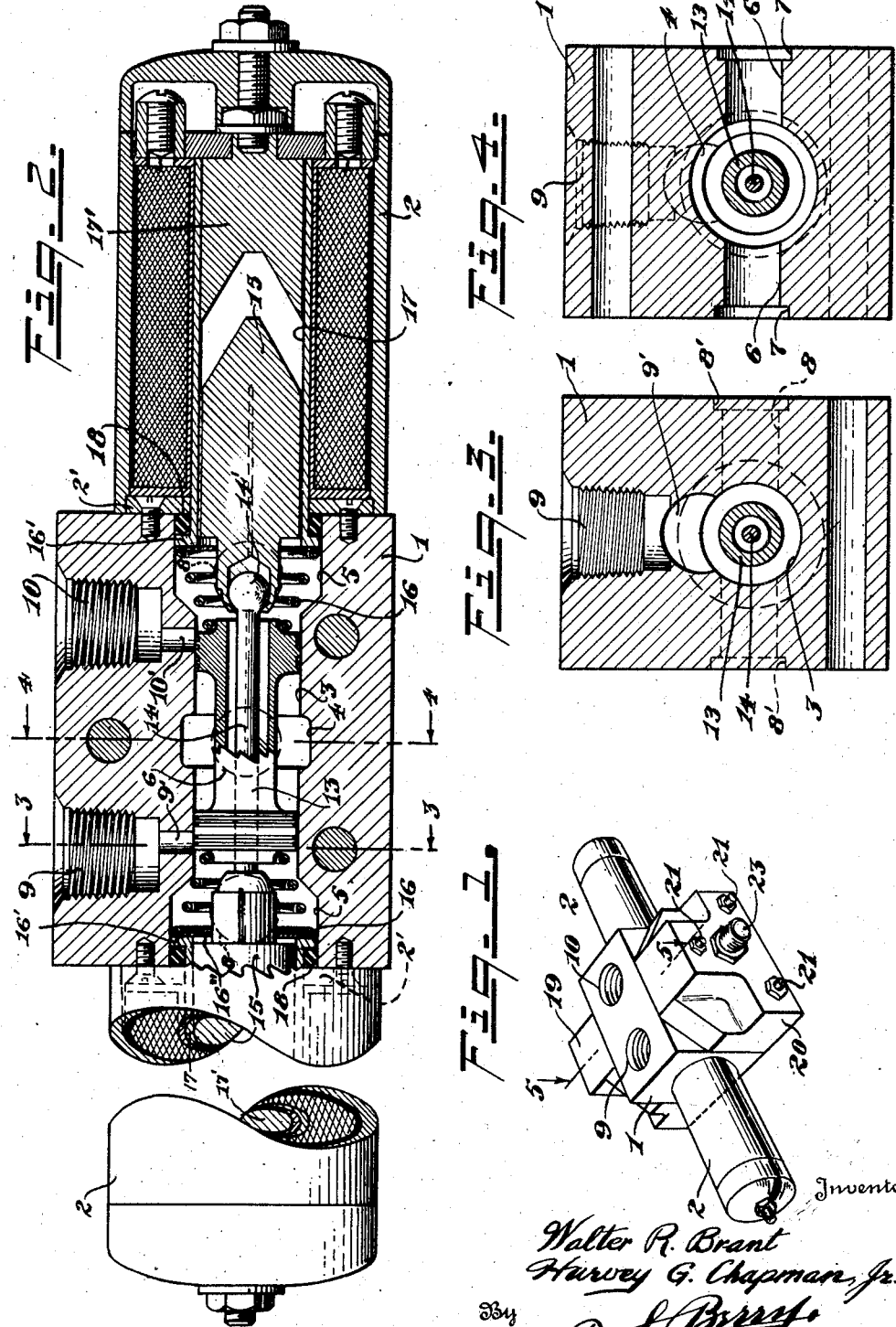

Patented July 23, 1946

2,404,349

UNITED STATES PATENT OFFICE 2,404,349

VALVE

Walter R. Brant and Harvey G. Chapman, Jr., Glendale, Calif., assignors to Adel Precision Products Corp., a corporation of California Application November 29, 1944, Serial No. 565,718

3 Claims. (Cl. 137—139)

1

This invention relates to valves, and more particularly to an electrically actuated valve which is characterized by the fact that it is self-contained in a valve body with all of its parts sealed within said body and with no parts extended through the body so as to require packing or other sealing means therearound.

Among the salient objects of the invention are: to provide a flow-reversing valve of the character above referred to having a spool or piston type of valve member, so constructed and arranged as to permit the "stacking" of a plurality of valve bodies with a single pressure line and a single return line common to all; to provide a valve body having a valve chamber therein and a valve member operable in said valve chamber, said valve member being connected at its opposite ends, with flexible connections, with two solenoids and their armatures for movement of said valve member for controlling the flow of operating fluid through said valve chamber to and from a place of use, as to the opposite ends of an operating cylinder; to provide in such a valve, a valve member with means for normally and yieldingly holding it in a neutral or balanced intermediate position until moved in one direction or the other; and, in general, to provide a valve of the character referred to which is economical to manufacture, simple in construction and arrangement, and efficient and certain in operation.

In order to explain our invention in detail, we have shown one practical embodiment thereof on the accompanying two sheets of drawings, which we will now describe:

Fig. 1 is a perspective view of a such a valve embodying our invention;

Fig. 2 is an enlarged, longitudinal sectional view through the valve body and one of the solenoids;

Fig. 3 is a cross sectional view taken on the line 3—3 of Fig. 2;

Fig. 4 is a cross sectional view taken on the line 4—4 of Fig. 2;

Fig. 5 is a transverse sectional view taken on the line 5—5 of Fig. 1; and

Fig. 6 is a schematic view, with the valve body and valve member and solenoids shown in longitudinal section, and also showing it connected with a source of operating fluid, and with an operating cylinder and piston.

Fig. 7 is a fragmentary sectional view taken on the line 7—7 of Fig. 5.

Referring now in detail to the drawings, the valve body 1 has attached to its opposite ends two solenoids 2, 2, and is provided therein with a longitudinal bore 3, having an enlarged central portion 4, and two enlarged portions at its opposite ends, designated 5, 5. This bore constitutes a valve chamber. Said body 1 is provided transversely in its middle with a bore 6, intersecting the enlarged central bore 4, and the outer ends of which bore 6, are enlarged, as at 7, Fig. 4, to receive gaskets 7' therein, at the juncture of end plates, or other valve bodies, attached thereto, as in Fig. 5.

Communicating with the enlarged end bores 5, 5, are transverse return bores, as 8, which are also enlarged at their outer ends to receive gaskets, as at 8', Fig. 3, in light broken lines.

Said body 1 is also provided with two main ports, as 9 and 10, threaded for the connection of pipes therewith for supply and return of operating fluid to an operating cylinder, again referred to. The inner ends of these ports 9 and 10 connect through slots 9' and 10' with the main bore or valve chamber 3, as shown in Fig. 2, and will also be understood from Figs. 3 and 6.

Movably mounted in the main bore or valve chamber 3 is a spool-type of valve member 13, which is hollow, and which is adapted to receive a loosely fitting connecting rod 14, having ball-shaped heads 14', which are connected with the ends of armatures 15, 15, as shown, said armatures being operable in the solenoids 2, 2, in the usual manner.

The opposite ends of the valve member 13 are formed to receive thereover coiled springs 16, 16, the other ends of which springs operate over the ends of the armatures 15, 15, in the enlarged end portions 5, 5, of the main bore 3, as shown, and bear against washers 16', 16' which abut tubular member 17 carried by the solenoids and surrounding the armatures 15. The ends of the armatures surrounded by the spring 16 are reduced and extend through the washer 16' for connection with the rod 14. The armatures are provided with shoulders 16" which are disposed to contact and move the washers 16'. When either solenoid is energized the armature of the other solenoid is pulled by the rod 14 and its shoulder 16" contacts the associated washer 16' and moves it away from the member 17 and compresses the associated spring 16, while the other spring 16 is compressed between the member 17 of the energized solenoid and the valve member 13. When one of the solenoids is de-energized following its operation, the springs 16 will return the valve member 13 to neutral position and also set the armatures 15 so that either solenoid may be operated.

Each of said solenoids 2, 2, has an attaching end plate or ring 2', for attaching the solenoid body to the body 1, as shown. Each tubular member 17 with a flange, is extended through said attaching ring 2', with a sealing ring 18, between the flange of said member 17, and the attaching ring 2', whereby to tightly seal the solenoid from the interior of the body 1, which will be filled with oil or other fluid. The armatures 15, 15, are provided in their sides with grooves, as 15', for the purpose of preventing stalling of the movement of the armature 15, by reason of trapped fluid within the inner tubular member 17, between the armature 15 and the fixed cores 17', at the outer ends of said solenoids.

This connection between the two armatures 15, 15, by the connecting rod 14, and the ball and socket joints, assures of flexibility for perfect alignment, and free flow of lubricating medium and proper sealing of the lubricating medium into the solenoids, connected to the opposite ends of the valve body, as clearly illustrated in Fig. 2.

Referring to Figs. 1 and 5, it will be seen that the valve body 1 is provided on its opposite sides with end plates 19 and 20, secured thereto by bolts 21, 21. The end plate 19 is formed as shown in Fig. 7 with a T-shaped return bore 19' the outer end of the shank of which has a fitting 22 therein affording connection with a return line. The ends of the head of the T-shaped return bore 19' are arranged to register with those outer ends of the return bores 8 which open on the side of the body opposed to the plate 19. The other ends of the bores 8 are closed by the end plate 20. The end plate 20 is provided with a bore 20', to communicate with the transverse bores 6, 6, in the main body 1, and with the enlarged central portion 4 of the main bore or valve chamber 3, as seen in Fig. 5. The gaskets 7', 7', are also seen between said end plates and the body 1. The bore 20' is provided at its outer end with a fitting 23 affording connection with a pressure line such as line 27 in Fig. 6.

These end plates, as 19 and 20, shown in Fig. 1, are used with one or with plural valve bodies connected together, and having a single return line and a single pressure line, as will be understood by those versed in the art.

In Fig. 6, said valve body is shown connected with a source of operating fluid 25, with pump 26, in pipe 27 leading to and connected with said valve body 1, through the bore or port 6, and the enlarged center portion 4 of the main bore 3, in which the spool valve 13 moves. A return pipe 28 is diagrammatically shown as connected by means of a Y to two return outlet ports 8, 8, at opposite ends of said valve chamber, and returns to the reservoir, or source of supply of hydraulic fluid 25, through pipe 28. In practice line 28 will be connected to the return bore 19' through the fitting 22. A safety or by-pass valve 29 is shown connected between pipes 27 and 28. This may be the usual by-pass valve.

The operating cylinder is designated 30, with operating piston 31 therein, for connection to the part to be moved, whatever it may be. The opposite ends of the cylinder 30 are connected by means of pipes 32 and 33, with the supply and return ports 9 and 10, respectively, as indicated.

In Fig. 6, the valve 13 is shown moved to the right incident to energization of the right hand solenoid, with pressure port 6 opened to the port 10 and cylinder line while the port 9 is opened to the return port 8 and return bore 19', with the consequent movement of the piston 31 to the left. Now if the armature and valve 13 are moved to the left by energizing of the left hand solenoid this will open port 9 to the pressure port 6, and port 10 to return port 8, with the consequent movement of the piston 31 and the movement of whatever member or part is connected thereto.

If both solenoids are deenergized, the valve element 13 will be centered by the springs 16, 16, and both ports 9 and 10 will be opened to the return ports 8, 8, as seen in the sectional view, Fig. 2. The restricted or slot connection between the ports 9 and 10 and the valve chamber facilitates this possible connection and the balance of the valve member 13 in the position shown in Fig. 2.

It will be understood, of course, that the usual electric connections to the solenoids are provided so that by the simple manipulation of a switch either of the solenoids can be energized. It is not believed that these electric connections are necessary to an understanding of the invention proper, which is the construction and arrangement of the valve body and valve element, and the connections therefor within a closed housing in the manner shown and described.

Thus by the simple manipulation of the proper switch it is possible to energize the desired solenoid and the valve member 13 will be moved in either direction for directing the operating fluid into the operating cylinder 30, for moving the piston and the mechanism connected therewith, whatever it may be.

It will be noted that all of the operating parts are within the valve body, and the valve chamber therein, and that only portions of the armatures of the solenoids work through the closed junctures at the opposite ends of said valve chamber, thus making the valve self-contained and closed in a manner to avoid any working parts operating through the body of the valve with the necessary packing or sealing means therearound.

We do not limit our invention, however, to the details of construction and arrangement shown for illustrative purposes, except as we may be limited by the hereto appended claims, forming a part thereof.

We claim:

1. A flow-reversing valve of the character referred to including a valve body having a valve chamber therein with ports for connecting a source of operating fluid under pressure to move through said valve chamber to and from a place of use, a hollow valve of the spool type operable in said valve chamber for controlling the flow of operating fluid therethrough, a solenoid connected with each end of said valve chamber, an armature in each solenoid and operable through the closed juncture between the ends of the valve chamber and said solenoids, a connecting rod from one armature to the other through said hollow valve, and a coiled spring interposed between each armature and the adjacent end of said valve for normally pressing them apart.

2. In a valve structure of the character referred to, a valve body having a cylindrical valve chamber therein enlarged at its opposite ends, a spool valve member operable therein, means for connecting a source of operating fluid under pressure through said valve chamber, to and from a place of use, controlled by said valve member, two solenoids connected with the opposite ends of said valve member for moving it in opposite directions, an armature in each solenoid, a coiled spring between the armature and its end of said valve member for normally pressing them apart, and a rod through said valve member connecting said armatures, whereby said armatures and valve member are flexibly connected for movement together.

3. In a valve mechanism, a valve body having a valve chamber therein, with port connections for passing an operating fluid therethrough to and from a place of use, a valve member operable in said valve chamber to control the flow of said operating fluid, said valve member being hollow, a solenoid connected with each end of said body and in register with the end of said valve chamber, an armature in each solenoid and operable through the juncture between said solenoid and said valve chamber, a coiled spring interposed between each armature and the end of said valve member and operating to press them apart, and a connecting rod extended through said valve member and having a ball and socket connection at each end with said armatures, respectively, for the purpose indicated.

WALTER R. BRANT.
HARVEY G. CHAPMAN, Jr.